| United States Patent [19]
Bolt et al.

[11] Patent Number: 4,970,095
[45] Date of Patent: Nov. 13, 1990

[54] METHOD FOR COATING SUBSTRATES WITH BORON NITRIDE

[75] Inventors: John D. Bolt, Landenberg, Pa.;
Frederick N. Tebbe, Hockessin, Del.

[73] Assignee: E. I. du Pont de Nemours and Company, Wilmington, Del.

[21] Appl. No.: 292,203

[22] Filed: Dec. 30, 1988

[51] Int. Cl.$^5$ .............................................. B05D 3/02
[52] U.S. Cl. ................................... 427/226; 427/343; 427/377; 423/294; 501/96
[58] Field of Search .................. 427/226, 343, 377; 423/394; 501/96

[56] References Cited

U.S. PATENT DOCUMENTS 4,642,271  2/1987  Rice ..................................... 428/698
4,762,729  8/1988  Hirano .............................. 427/255.3

OTHER PUBLICATIONS

Rees et al., J. Am. Ceram. Soc., 71(4)C-194–C-196 (1988).
Yogo et al., Yogyo Kyokaishi, 95(1), 94–8 (1987).
Muetterties et al., Inorganic Chemistry 3:444 (1986).
Knoth et al., J. Am. Chem. Soc., vol. 86(19): 3973–3983 (1964).

Primary Examiner—Janyce Bell

[57] ABSTRACT

A method of producing coatings of boron nitride on substrates by the application of solutions containing boron compounds.

22 Claims, 20 Drawing Sheets

METHOD FOR COATING SUBSTRATES WITH BORON NITRIDE

BACKGROUND OF THE INVENTION

1. Field of the Invention

Boron nitride coatings on ceramic fibers are useful in ceramic matrix composites. Boron nitride provides an intermediate phase with low shear strength, between the fiber and the matrix at which cracks propagating through the matrix are deflected. The crack deflection ability of the boron nitride coating, and its resistance to oxidation and reaction with various ceramics, provides a mechanism for toughening the composite and for preventing serious mechanical failures. Boron nitride is typically applied to fibers by chemical vapor deposition (CVD). Although CVD produces good quality coatings, the process requires long application times, complex gas handling equipment and, thus, is not economical.

To avoid the disadvantages experienced with the current CVD methods of boron nitride application, various alternatives to CVD applied boron nitride have been investigated. Most involve the use of "pre-ceramic" polymers containing boron and nitrogen and the steps of synthesizing these polymers, applying these polymers to substrates, evaporating the solvent and pyrolyzing the coatings to obtain boron nitride. Some of the polymers are based on borazine. Others use boron hydrides. These processes are cumbersome as they require a multiple step synthesis of the polymer and may leave a carbon residue from the polymer employed. Further, the carbon residue may react with the fibers or the matrix and weaken the composite or may be oxidized easily.

The current invention avoids the problems of both CVD processes and alternative procedures using "pre-ceramic" polymers, by first applying a solution containing a boron hydride ion directly to a substrate then converting the coating on the substrate to boron nitride by pyrolysis in an ammonia atmosphere. Application of boron hydride ion salts to substrates offers an advantage over pre-ceramic polymers because of their simpler preparation and use. In addition, the present process offers a high conversion of boron salts to boron nitride and eliminates the problems associated with the handling of toxic volatile boron compounds.

2. Prior Art

Various processes involving the synthesis and use of boron nitride or boron nitride with boron carbide have been reported.

Rees, William Smith, Jr. and Dietmar Seyferth, *J. Am. Ceram. Soc.*, 71(4)C-194-C-196 (1988) disclose $B_{10}H_{12}$ diamine polymers that can be processed to serve as BN precursors. Their pyrolysis at 1000° C., under an atmosphere of $NH_3$ yields BN.

U.S. Pat. No. 4,642,271 which claims a ceramic fiber composite containing boron nitride.

Toshinobu Yogo, Shigeru Matsuo, Shigeharu Naka, *Yogyo Kyokaishi*, 95(1), 94–8 (1987) disclose the synthesis of boron nitride from triammonia decaborane and ammonia at 800° C. and atmospheric pressure.

None of the references uncovered by applicant's search involve the application of solutions of $B_{10}H_{10}^{-2}$ and $B_{12}H_{12}^{-2}$ salts along with a soluble polymer as taught herein.

SUMMARY OF THE INVENTION

The invention resides in the method of producing coatings of boron nitride on substrates by the application of solutions containing boron compounds of the following formulas:

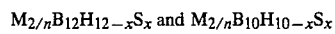

$$M_{2/n}B_{12}H_{12-x}S_x \text{ and } M_{2/n}B_{10}H_{10-x}S_x$$

wherein:
x is 0–6;
S is selected from the group consisting of $NO_2$, F, Cl, Br, I, $HOCH_2$, OH, $C_6H_5CO$ and $(CH_3)_3C$;
M is any cation of valence n, preferably $H_3O^+$, $NH_4^+$ and $NR_4^+$ where $R=C_yH_{2y+1}$, y=1 to 10;
and, optionally, a water or alcohol soluble polymer such as polyethylene oxide, followed by heating the coated substrates in the presence of ammonia at an elevated temperature.

DETAILS OF THE INVENTION

The coatings of the present invention are produced by applying solutions of $M_{2/n}B_{12}H_{12-x}S_x$ and $M_{2/n}B_{10}H_{10-x}S_x$ and, optionally, a polymer that is soluble in water or in a polar organic solvent, to a substrate. The substrate is dried then heated in an atmosphere of ammonia or ammonia diluted with inert gas at an elevated temperature.

The boron compounds which are suitable for the process of this invention include $M_{2/n}B_{12}H_{12-x}S_x$ and $M_{2/n}B_{10}H_{10-x}S_x$ where x=0–6 and S is selected from the group consisting of $NO_2$, F, Cl, Br, I, $HOCH_2$, OH, $C_6H_5CO$ and $(CH_3)_3C$ and M is any cation of valence n, preferably $H_3O^+$, $NH_4^+$ and $NR_4^+$ where $R=C_yH_{2y+1}$, y=1 to 10. The most preferred compound is $(NH_4)_2B_{12}H_{12}$.

The hydrogen atoms on $M_{2/n}B_{12}H_{12}$ and $M_{2/n}B_{10}H_{10}$ can be substitued with the above functional groups as a result of similar electrophilic reactions to those used to replace hydrogen in benzene. Some of these electrophilic reactions are as follows:

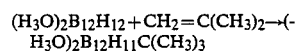

$$(H_3O)_2B_{12}H_{12} + CH_2=C(CH_3)_2 \rightarrow (H_3O)_2B_{12}H_{11}C(CH_3)_3$$

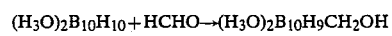

$$(H_3O)_2B_{10}H_{10} + HCHO \rightarrow (H_3O)_2B_{10}H_9CH_2OH$$

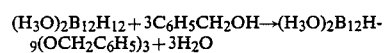

$$(H_3O)_2B_{12}H_{12} + 3C_6H_5CH_2OH \rightarrow (H_3O)_2B_{12}H_9(OCH_2C_6H_5)_3 + 3H_2O$$

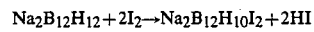

$$Na_2B_{12}H_{12} + 2I_2 \rightarrow Na_2B_{12}H_{10}I_2 + 2HI$$

The concentration of $M_{2/n}B_{12}H_{12-x}S_x$ and $M_{2/n}B_{10}H_{10-x}S_x$ in solution can range from about 0.02 wt % to 35 wt %, preferably 0.5 to 3 wt %.

Solvents which are suitable for dissolving $M_{2/n}B_{12}H_{12-x}S_x$ and $M_{2/n}B_{10}H_{10-x}S_x$ include water and polar organic solvents such as methanol and ethanol. In addition water-polar organic solvent mixtures may be used as solvents.

Water and/or polar organic solvent soluble polymers may be added to the coating and are included in the preferred embodiment of the invention. The polymer should leave little or no residue when pyrolyzed in an inert gas or ammonia atmosphere. Preferred polymers are polyethylene oxide (PEO) polymers having a molecular weight range of 500 to 5,000,000; preferably 20,000 to 500,000.

The concentration of polymer in solution can range from 0.05 wt % to 10 wt %.

The polymer contained in the solution is critical to the surface coverage of the substrates with boron nitride. With a soluble polymer in solution the surface coverage of the substrate is usually greater than 90%. Without polymer, the surface coverage is between 51% and 76%.

The solutions can be applied to the substrates by any conventional means such as dipping, spraying or spin coating.

The solution coated substrates are converted to boron nitride coated substrates by heating in an atmosphere of ammonia or ammonia diluted with an inert gas such as argon, helium or nitrogen, at a temperature of 800° C. to 1500° C. for a period of 1 minute to 100 minutes.

Multiple applications of BN can be made to the substrates by the process of this invention if so desired.

Substrates which can be coated by the method of this invention include, but are not limited to, inorganic ceramic fibers such as aluminum oxide fibers, $B_4C$, B, C (graphite), $ZrO_2$, $HfO_2$, $TiO_2$, $Al_2O_3$, AlN, SiC, $Si_3N_4$, $SiO_2$ (quartz) or fibers which are mixtures of the previous compounds.

EXAMPLES

Preparation of Salts of $B_{12}H_{12}^{-2}$

A mixture of 15.1 g (0.4 mole) of sodium borohydride, 60 ml of triethylamine and 30 g (1.1 mole) of diborane in a 400 ml shaker tube was heated at 180° C. for 12 hours. The gases were vented and the tube was pressured to 200 psi with nitrogen and was vented again to remove excess diborane. The crude product was dissolved in 200 ml of hot tetrahydrofuran. The solution was filtered and 250 ml of 1,2-dimethoxyethane ("glyme") was added. A microcrystalline white precipitate of $Na_2B_{12}H_{12} \cdot 3.5$ glyme·$H_2O$ separated. This salt was dissolved in 120 ml of water. The solution was warmed on a steam bath and steam was bubbled through the solution for 30 minutes to remove glyme. Evaporation of the solution under reduced pressure gave 27 g of white, crystalline $Na_2B_{12}H_{12} \cdot 2H_2O$.

Analysis for $Na_2B_{12}H_{12} \cdot 2H_2O$: Calculated: B, 57.96; H, 7.20. Found: B, 58.19; H, 6.90.

A 5.7 g sample of $Na_2B_{12}H_{12} \cdot 2H_2O$ was acidified by passage through an Amberlite IR 12OH ion exchange column. The acidic eluent was concentrated under reduced pressure in a rotating evaporator and the white crystalline acid was dried at 40° C. at 0.05 mm for 1 hour, m.p. 82° C. The infrared spectrum contained the typical BH stretching at 4.0 microns and $B_{12}$ skeletal absorption at 9.35 microns.

Analysis for $(H_3O)_2B_{12}H_{12} \cdot 2H_2O$: Calculated: B, 60.11%; H, 10.27%. Found: B, 60.73%; H, 10.40%.

$(NH_4)_2B_{12}H_{12}$ was prepared by neutralizing $(H_3O)_2B_{12}H_{12}$ with ammonia or ammonium hydroxide.

Preparation of Salts of $B_{10}H_{10}^{-2}$

A solution of 100 g of decaborane (toxic) in 500 ml of dimethyl sulfide (Matheson, Coleman, Bell, practical grade) was prepared in a 1 l. Erlenmeyer flask and filtered by gravity into a 1 l. round bottom flask. The flask was fitted with condenser and drying tube and was allowed to stand at room temperature for 48 hours. The orange solution thus obtained was treated with a seed crystal of bis(dimethylsulfide)decaborane. The mixture became almost solid with light yellow crystals. The excess methyl sulfide was evaporated under reduced pressure and the residual crystals were placed in a 4 l. Erlenmeyer flask. About 750 g of liquid ammonia was added and the mixture was allowed to stand overnight. The liquid ammonia dissolved all the bis(dimethylsulfide)decaborane. It was then allowed to evaporate to give 125 g of white crystalline $(NH_4)_2B_{10}H_{10}$. The product is purified by dissolving the crude product in 100 ml of water. The solution is filtered and partially evaporated under reduced pressure to give a collection of fine, white needles of $(NH_4)_2B_{10}H_{10}$.

EXAMPLES 1-6

The following solutions were prepared:

(1) 2% $(NH_4)_2B_{12}H_{12}$ in $H_2O$ with 1.0% PEO (MW 100,000)

(2) 2% $(NH_4)_2B_{12}H_{12}$ in $H_2O$ with 0.2% PEO (MW 100,000)

(3) 2% $(NH_4)_2B_{12}H_{12}$ in Methanol with 5.0% Glycerol (4) 2% $(NH_4)_2B_{12}H_{12}$ in Methanol (5) 2% $(NH_4)_2B_{12}H_{12}$ in Absolute Ethanol (6) 2% $(NH_4)_2B_{12}H_{12}$ in $H_2O$ Into each of the above solutions was dipped a strand of yarn of $Al_2O_3/ZrO_2$ [U.S. Pat. No. 4,753,904] which had been previously heated to 600° C. in air for two hours to burn off surface contaminants. After dipping the yarn into the solution, the tip end of the yarn was touched to a blotter to remove excess solution. The yarn was dried in a stream of hot air from a heat gun while flexing the yarn to prevent excessive interfilament sticking. Each of the six pieces of yarn were placed into an $Al_2O_3$ boat and placed in a quartz pyrolysis tube. The tube was flushed with ammonia and then heated in the ammonia flow at 15° C./minute to 100° C. and then at 5° C./minute from 100° C. to 850° C. and finally held at 850° C. for 45 minutes. The yarns were cooled and the surfaces analyzed by X-ray photoelectron spectroscopy. The purity of the boron nitride on the surface was determined by the B/N atom ratio and the surface coverage of boron nitride was determined by the B/(Al+Zr+B) atom ratio. The results are given in Table 1.

TABLE 1

| Example | B/N | B/(Al + Zr + B) |
|---------|------|-----------------|
| 1 | 1.17 | 0.920 |
| 2 | 1.00 | 0.720 |
| 3 | 0.95 | 0.762 |
| 4 | 0.92 | 0.679 |
| 5 | 0.84 | 0.518 |
| 6 | 0.88 | 0.511 |

Although preferred embodiments have been illustrated hereinabove, it is understood that there is no intent to limit the invention to the precise constructions described and it is further understood that the right is reserved to all changes and modifications which fall within the scope of the claims.

What is claimed is:

1. A method of producing a coating of boron nitride on a substrate comprising the steps of:
   (a) applying to the substrate a solution containing a boron salt selected from the following structures:

$M_{2/n}B_{12}H_{12-x}S_x$ and $M_{2/n}B_{10}H_{10-x}S_x$ wherein:
   x is 0-6;

S is selected from the group consisting of $NO_2$, F, Cl, Br, I, $HOCH_2$, OH, $C_6H_5CO$ and $(CH_3)_3C$;

M is any cation of valence n where n is 1 or 2 in a solvent;

(b) heating the coated substrate to a temperature of from about 800° C. to about 1500° C., in the presence of ammonia.

2. The method of claim 1 wherein the concentration of the boron salt in solution ranges from 0.02 wt % to 35 wt %.

3. The method of claim 2 wherein the concentration of the boron salt is between 0.5 wt % to 3 wt %.

4. The method of claim 1 wherein a water soluble polymer is included in the solution.

5. The method of claim 4 wherein the concentration of polymer in solution is from 0.05 wt % to 10 wt %.

6. The method of claim 5 wherein the water soluble polymer is selected from the group consisting of polyethylene oxide polymers having a molecular weight range of from 500 to 5,000,000.

7. The method of claim 6 wherein the water soluble polymer is selected from the group consisting of polyethylene oxide polymers having a molecular weight range of from 20,000 to 500,000.

8. The method of claim 1 where M is selected from $H_3O^+$, $NH_4^+$ and $NR_4^+$, where R is $C_yH_{2y+1}$ where y=1 to 10.

9. The method of claim 1 in which the heat is applied for a period of from 1 minute to 100 minutes.

10. The method of claim 1 or claim 4 wherein the solvent is chosen from the group consisting of water, a polar organic solvent and a water and polar organic solvent mixture.

11. The method of claim 10 in which the polar organic solvent is chosen from ethanol and methanol.

12. The method of claim 1 containing a water soluble polymer.

13. A solution for producing coatings of boron nitride on suitable substrates consisting of boron salts of the following formulas:

$$M_{2/n}B_{12}H_{12-x}S_x \text{ and } M_{2/n}B_{10}H_{10-x}S_x$$

wherein:
x is 0–6;
S is selected from the group consisting of $NO_2$, F, Cl, Br, I, $HOCH_2$, OH, $C_6H_5CO$ and $(CH_3)_3C$;
M is any cation of valence n where n is 1 or 2; and a polar organic solvent chosen from methanol and ethanol.

14. A solution for producing coatings of boron nitride on substrates consisting of boron salts of the following formulas:

$$M_{2/n}B_{12}H_{12-x}S_x \text{ and } M_{2/n}B_{10}H_{10-x}S_x$$

wherein:
x is 0–6;
S is selected from the group consisting of $NO_2$, F, Cl, Br, I, $HOCH_2$, OH, $C_6H_5CO$ and $(CH_3)_3C$;
M is any cation of valence n, where n is 1 or 2 and, a water soluble polymer chosen from the group consisting of polyethylene oxide polymers having molecular weights of 500 to 5,000,000, in a solvent.

15. A solution for producing coatings of boron nitride on substrates, consisting of boron salts of the following formulas:

$$M_{2/n}B_{12}H_{12-x}S_x \text{ and } M_{2/n}B_{10}H_{10-x}S_x$$

wherein:
x is 0–6;
S is selected from the group consisting of $NO_2$, F, Cl, Br, I, $HOCH_2$, OH, $C_6H_5CO$ and $(CH_3)_3C$;
M is a cation selected from $H_3O^+$, $NH_4^+$ and $NR_4^+$ where $R=C_yH_{2y+1}$, y=1 to 10; and, a water soluble polymer chosen from the group consisting of polyethylene oxide polymers having molecular weights of 500 to 5,000,000, in a solvent.

16. The method of claim 1 wherein the substrate to be coated is chosen from the group consisting of inorganic ceramic fibers.

17. The method of claim 16 wherein the inorganic ceramic fibers are chosen from the group consisting of $B_4C$, B, C (graphite), $ZrO_2$, $HfO_2$, $TiO_2$, $Al_2O_3$, AlN, SiC, $Si_3N_4$, $SiO_2$ (quartz) and mixtures thereof.

18. The method of claim 1 wherein the heating in ammonia step is done in the presence of inert gases.

19. The solution of claim 13 containing a water soluble polymer.

20. The solution of claim 13 where M is selected from $H_3O^+$, $NH_4^+$ and $NR_4^+$ where $R=C_yH_{2y+1}$, y=1 to 10.

21. The solution of claim 14 where M is selected from $H_3O^+$, $NH_4^+$ and $NR_4^+$ where $R=C_yH_{2y+1}$, y=1 to 10.

22. The solution of claim 15 where M is selected from $H_3O^+$, $NH_4^+$ and $NR_4^+$ where $R=C_yH_{2y+1}$, y=1 to 10.

* * * * *